United States Patent [19]
Loehr et al.

[11] 4,390,512
[45] * Jun. 28, 1983

[54] PROCESS FOR PRODUCING CALCIUM HYPOCHLORITE

[75] Inventors: Clifford E. Loehr, Norton; Roger A. Crawford, Wadsworth; John E. Carbaugh, Akron; Cletus N. Welch, Clinton, all of Ohio

[73] Assignee: PPG Industries, Inc., Pittsburgh, Pa.

[*] Notice: The portion of the term of this patent subsequent to May 4, 1999, has been disclaimed.

[21] Appl. No.: 350,653

[22] Filed: Feb. 22, 1982

Related U.S. Application Data

[63] Continuation-in-part of Ser. No. 269,241, Jun. 1, 1981, Pat. No. 4,328,200.

[51] Int. Cl.³ .............................................. C01B 11/06
[52] U.S. Cl. ................................................... 423/474
[58] Field of Search .......................................... 423/474

[56] References Cited

U.S. PATENT DOCUMENTS

| | | | |
|---|---|---|---|
| 1,718,284 | 6/1929 | George et al. | 423/474 |
| 1,718,285 | 6/1929 | George | 423/474 |
| 1,937,613 | 12/1933 | Weber, Jr. | 23/86 |
| 2,007,429 | 7/1935 | Klopstock et al. | 23/86 |
| 2,368,042 | 1/1945 | Robson | 23/86 |
| 2,441,337 | 5/1948 | Sprauer | 23/86 |
| 2,469,901 | 5/1949 | Sprauer | 23/86 |
| 3,251,647 | 5/1966 | Nicolaisen | 23/86 |
| 3,572,989 | 3/1971 | Tatara et al. | 23/86 |
| 3,767,775 | 10/1973 | Tatara et al. | 423/474 |
| 3,895,099 | 7/1975 | Sakowski | 423/474 |
| 3,950,499 | 4/1976 | Miyashin et al. | 423/474 |
| 3,954,948 | 5/1976 | Sakowski | 423/474 |
| 4,258,024 | 3/1981 | Hoffer et al. | 423/474 |
| 4,328,200 | 5/1982 | Welch | 423/474 |

FOREIGN PATENT DOCUMENTS 1544268  4/1979  United Kingdom ................ 423/474

Primary Examiner—Brian E. Hearn
Attorney, Agent, or Firm—Irwin M. Stein

[57] ABSTRACT

A continuous integrated process for the production of neutral calcium hypochlorite in which crystals of by-product sodium chloride are more easily separated from the calcium hypochlorite product is described. The process includes diluting an aqueous slurry of sodium hydroxide, lime and bleach mother liquor with aqueous salt solution saturated with calcium ion and sodium chloride and chlorinating the resulting aqueous admixture in the presence of a seed bed of sodium chloride crystals and calcium hypochlorite crystals at temperatures less than 35° C., e.g., 15°-20° C. A suspension of readily separable, sodium chloride crystals and calcium hypochlorite crystals in chlorinator liquor is conveyed to a classification zone where the sodium chloride and calcium hypochlorite crystals are separated.

22 Claims, 1 Drawing Figure

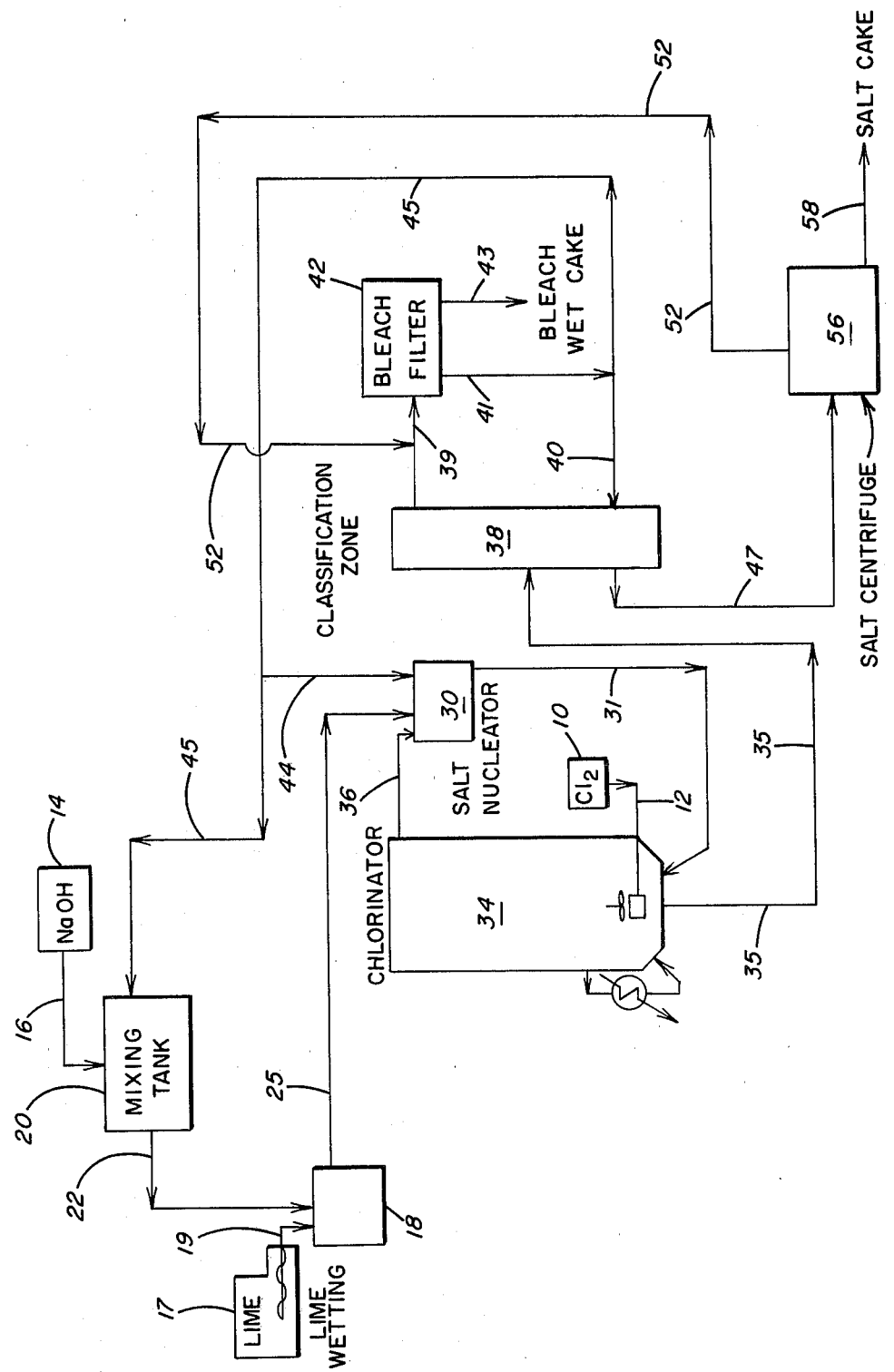

PROCESS FOR PRODUCING CALCIUM HYPOCHLORITE

CROSS REFERENCE TO RELATED APPLICATIONS

This application is a continuation-in-part application of our copending U.S. application Ser. No. 269,241, filed June 1, 1981 of the same title, now U.S. Pat. No. 4,328,200.

DESCRIPTION OF THE INVENTION

The present invention relates to the manufacture of neutral calcium hypochlorite of high purity and available chlorine content by an improved continuous cyclic process. Calcium hypochlorite enjoys a major portion of the market for available chlorine compounds, aside from chlorine itself, because it is the cheapest and most stable solid composition known which delivers all of its available chlorine immediately on contact with oxidizable materials. Calcium hypochlorite compositions containing at least 65 percent of available chlorine have been on the market for many years and is used primarily as a commercial bleaching and sanitizing agent, particularly in the disinfection of swimming pool waters.

A variety of processes for manufacturing calcium hypochlorite from lime and alkali, e.g., sodium hydroxide, have been proposed. Most are directed to producing the best quality calcium hypochlorite product free of deleterious contaminants and diluents at the lowest possible cost. Others are designed to reduce waste materials resulting from the process.

For example, U.S. Pat. No. 1,718,284 describes the chlorination of a slurry made up of lime, caustic soda or sodium hypochlorite, and a solution saturated with respect to both sodium chloride and calcium hypochlorite. The calcium hypochlorite product produced is recovered, e.g., by filtration, and the filtrate employed as the liquid medium in which successive chlorination are carried out. In a further embodiment, sodium chloride crystals produced by the chlorination reaction are separated before precipitation of the calcium hypochlorite crystals begins.

U.S. Pat. No. 3,251,647 describes a process in which a slurry of lime and recycled calcium hypochlorite crystals suspended in a mixture of aqueous caustic soda and recycle liquor is chlorinated in a recycle line. The chlorinated slurry is forwarded to an evacuated evaporating zone and then to a classifying zone. A slurry is removed from about the mid-point of the classifying zone and cycled to the evaporating zone as recycle liquor.

U.S. Pat. No. 3,572,989 describes a cyclic process for producing calcium hypochlorite wherein sodium hydroxide is added to an aqueous solution saturated with calcium hypochlorite and sodium chloride and the mixture chlorinated to produce crystalline sodium chloride. The sodium chloride crystals are isolated from the aqueous chlorinated reaction mixture and calcium hydroxide is then added to the reaction mixture. This calcium hydroxide-containing mixture is chlorinated to produce crystalline calcium hypochlorite and a mother liquor saturated with calcium hyochlorite and sodium chloride. The crystalline calcium hypochlorite is recovered from the mother liquor and the mother liquor recycled to the first step.

U.S. Pat. No. 3,767,775 describes a process for producing calcium hypochlorite in which a mixture of one weight part of sodium hydroxide, about 0.93 to 1.02 weight parts of calcium hydroxide, about 0.9 to about 1.1 weight parts of water and about 13 to about 20 weight parts of mother liquor pregnant with sodium chloride and calcium hypochlorite is chlorinated. Calcium hypochlorite and sodium chloride crystals thereby produced are separated from the suspending mother liquor, which is recycled to the start of the process.

U.S. Pat. No. 3,950,499 describes a multi-step process for preparing calcium hypochlorite in which sodium hydroxide is mixed with an aqueous solution saturated with calcium hypochlorite and sodium chloride, which also contains a small amount of calcium hypochlorite crystals and sodium chloride crystals. This mixture is chlorinated to produce sodium chloride crystals and an aqueous chlorinated reaction mixture. The so formed sodium chloride crystals are separated from the aqueous chlorinated reaction mixture. Calcium hydroxide and further sodium hydroxide are then added to the resulting mother liquor. The resulting mixture is chlorinated to produce a slurry containing mainly sodium chloride crystals and calcium hypochlorite crystals and a mother liquor saturated with calcium hypochlorite and sodium chloride. The crystals of calcium hypochlorite and sodium chloride are separated and the mother liquor associated with the calcium hypochlorite crystals recycled to the start of the process.

U.S. Pat. No. 3,954,948 describes a process for the manufacture of calcium hypochlorite in which an aqueous slurry of lime and sodium hypochlorite is chlorinated in a mixing zone to form a sodium chloride solution containing large crystals of calcium hypochlorite which are separated and dried. The solution from which the calcium hypochlorite crystals are separated is reacted with alkali metal hydroxide to precipitate lime, a slurry of which is separated and recycled to the first step of the process. The lime-free solution is used as bleach liquor or processed to precipitate solid salt and sodium hypochlorite solution, which can be recycled to the first step of the process.

U.S. Pat. No. 4,258,024 describes a process in which milk of lime is reacted with recycled mother liquor containing calcium hypochlorite to form a suspension of dibasic calcium hypochlorite. This suspension is thickened, and the thickened slurry of dibasic calcium hypochlorite introduced into a chlorination zone together with separately introduced sodium hydroxide. Gaseous chlorine is introduced into the chlorination zone, which contains a bed of preformed crystals of neutral calcium hypochlorite and sodium chloride. Calcium hypochlorite and sodium chloride crystals are removed as a suspension from the chlorination zone and recovered. Mother liquor contained from recovering the calcium hypochlorite and/or sodium chloride is recycled to react with further milk of lime.

In copending U.S. application Ser. No. 269,241, filed June 1, 1981, a process for producing neutral calcium hypochlorite from dibasic calcium hypochlorite, sodium hydroxide and chlorine is described. In that process, an aqueous slurry of dibasic calcium hypochlorite is admixed with sodium hydroxide and salt solution substantially saturated with calcium hypochlorite and sodium chloride in the absence of added elemental chlorine. The resulting aqueous admixture is chlorinated in the presence of a seed bed of sodium chloride crystals and neutral calcium hypochlorite crystals, thereby forming an aqueous medium containing a suspension of calcium hypochlorite crystals that are readily separable from the larger sodium chloride crystals.

It has now been discovered that by using the techniques described in the aforesaid copending application, sodium chloride crystals having a size significantly larger than the calcium hypochlorite crystals can also be achieved with a source of calcium hydroxide other than dibasic calcium hypochlorite. Such larger crystals of sodium chloride can be readily separated from the smaller crystals of calcium hypochlorite because of this size difference and the difference in apparent density of the sodium chloride crystals compared to the particles of agglomerated calcium hypochlorite crystals.

In particular, it has been found that readily separable crystals of sodium chloride and calcium hypochlorite can be formed by diluting (a) an aqueous slurry of sodium hydroxide, lime, and bleach mother liquor (an aqueous solution substantially saturated with sodium chloride and calcium hypochlorite) with (b) aqueous salt solution saturated with calcium ion and sodium chloride, and chlorinating the resulting aqueous admixture in the presence of a seed bed of sodium chloride crystals and neutral calcium hypochlorite crystals at temperatures at which loss of calcium hypochlorite by accelerated decomposition is avoided. Calcium hypochlorite particles and the larger sodium chloride crystals produced by the aforesaid process are readily separated and bleach mother liquor is recycled to the start of the process.

In a preferred embodiment, the process of the present invention comprises a sequence of steps including:

(a) admixing with agitation in the absence of added elemental chlorine an aqueous solution of sodium hydroxide and bleach mother liquor obtained from step (h), (b) admixing lime with the aqueous mixture obtained in step (a), (c) diluting the aqueous lime slurry of step (b) with aqueous salt solution saturated with calcium ion and sodium chloride, the weight ratio of said aqueous salt solution to said aqueous lime slurry being at least about 3:1, (d) adding elemental chlorine to the diluted aqueous lime slurry of step (c) in a chlorination zone containing a seed bed of sodium chloride crystals and neutral calcium hypochlorite crystals at temperatures at which loss of calcium hypochlorite by accelerated decomposition is avoided, thereby forming further neutral calcium hypochlorite crystals and sodium chloride crystals in aqueous chlorinator liquor, said sodium chloride crystals being significantly larger than the calcium hypochlorite crystals, (e) removing chlorinator liquor containing a suspension of calcium hypochlorite crystals and the larger sodium chloride crystals from the chlorination zone, (f) segregating said larger crystals of sodium chloride from said crystals of calcium hypochlorite in a classification zone to form an aqueous slurry rich in crystals of calcium hypochlorite and an aqueous slurry rich in crystals of sodium chloride, (g) separating aqueous slurry rich in calcium hypochlorite crystals into a wet cake of calcium hypochlorite and bleach mother liquor, and (h) recycling bleach mother liquor to step (a).

BRIEF DESCRIPTION OF THE DRAWING

The specific features and advantages of the present invention will become more clear from the following detailed description made with reference to the drawing, which is a schematic flow diagram of the process steps of an embodiment of the present invention.

DETAILED DESCRIPTION OF THE INVENTION

Referring to the drawing, there is shown storage vessel 14 for aqueous sodium hydroxide. Sodium hydroxide is introduced into mixing vessel 20 by means of flow line 16. In a preferred embodiment, all of the sodium hydroxide requirements for the process are introduced into mixing vessel 20. In a further embodiment, a portion of the sodium hydroxide requirements is introduced into mixing vessel 20 and the remainder introduced into a vessel downstream of vessel 20, e.g., lime wetting vessel 18, salt nucleator 30, and/or chlorinator 34. When the sodium hydroxide charged to the process is split among various vessels, it is preferred for economic and operating reasons that the split be confined to the mixing vessel 20 and salt nucleator 30, with the majority of the requirements introduced into vessel 20.

The amount of sodium hydroxide used in the process described herein is in substantially stoichiometric amounts based on the calcium oxide content of the lime feed charged to lime wetting vessel 18 in accordance with the overall following balanced equation:

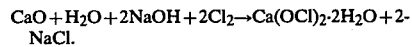

$$CaO + H_2O + 2NaOH + 2Cl_2 \rightarrow Ca(OCl)_2 \cdot 2H_2O + 2NaCl.$$

In a preferred embodiment, the process is performed with slightly less than the stoichiometric amount of sodium hydroxide indicated in the aforesaid equation, i.e., less than a mole ratio of 2:1, to avoid the formation of sodium hypochlorite solids in the final product since sodium hypochlorite is much less stable than calcium hypochlorite in the solid state. Typically, from about 1.7 to 2.0, more typically from 1.8 to 1.9, moles of sodium hydroxide for each mole of calcium oxide charged to the process is used.

The concentration of the sodium hydroxide used will depend to a large extent on the amount of water make-up required for the process as a result of water removed from the system with the calcium hypochlorite wet cake by means of flow line 43, water removed with the sodium chloride salt cake by means of flow line 58 and losses which occur as a result of spills, evaporation from open tanks, etc. Typically, the concentration of sodium hydroxide will range between about 40 and 73 weight percent, more typically between about 50 and about 65, e.g., 56–57 weight percent. The sodium hydroxide can be added in anhydrous form, if desired. In that case, water would be added separately to such vessel(s) or elsewhere in the system to satisfy the water balance of the integrated process. Storage vessel 14 should be heated and flow line 16 heat traced when concentrated sodium hydroxide is used to maintain the sodium hydroxide therein in a liquid state and prevent it from solidifying. For example, a 60 weight percent aqueous sodium hydroxide solution freezes at about 53.3° C. (128° F.).

Also added to mixing vessel 20 by flow line 45 is bleach mother liquor, an aqueous recycle stream substantially saturated with calcium hypochlorite and sodium chloride at the temperature of operation. Sodium hydroxide introduced into vessel 20 is in amounts at least sufficient to provide the stoichiometric proportion to react with all of the calcium hypochlorite in the bleach mother liquor in accordance with the following balanced equation:

$$2NaOH + Ca^{2+} \rightarrow Ca(OH)_2 + 2Na^+$$

Preferably, an excess of sodium hydroxide above the stoichiometric proportion is used, and more preferably all of the sodium hydroxide requirements of the process are added to this vessel. The exact amount of sodium hydroxide added to vessel 20 (when the sodium hydroxide reactant feed is split among at least two vessels) will depend on the volume of bleach mother liquor introduced into mixing tank 20 and the concentration of calcium hypochlorite therein. Mixing tank 20 is equipped with agitator means so that the bleach mother liquor and sodium hydroxide can be readily admixed to form a well-stirred mixture in a relatively short time.

Bleach mother liquor is introduced into mixing tank 20 in amounts sufficient to provide an aqueous medium adequate to at least thoroughly wet the lime charged to lime wetting vessel 18 and provide a readily pumpable slurry therefrom. Advantageously, the weight ratio of bleach mother liquor to sodium hydroxide (anhydrous basis) in mixing tank 20 is between about 5.2:1 and 12.5:1, preferably between about 8:1 and about 10.5:1. The aforesaid weight ratios results in the chlorinated reaction mixture in chlorinator 34 having an available chlorine content of greater than 16.5 weight percent, which, in turn, results in the present process in the production of large crystals of salt that are readily separable from the calcium hypochlorite particles.

When the concentration of sodium hydroxide used is at least about 53 weight percent, e.g., at least about 56 weight percent, the addition thereof to bleach mother liquor in mixing tank 20 results in the precipitation of sodium chloride therein. If less than 53 weight percent, e.g., 50 weight percent sodium hydroxide is used little, if any, solid sodium chloride is produced in vessel 20.

The reaction of sodium hydroxide with calcium hypochlorite present in solution in the bleach mother liquor in mixing vessel 20 forms an aqueous slurry of precipitated lime. This slurry, which can contain precipitated sodium chloride, is forwarded by flow line 22 to lime wetting vessel 18. The aqueous slurry forwarded to vessel 18 is suitable for wetting lime introduced thereto from storage vessel 17 by means of flow line 19. Since at least a stoichiometric proportion of sodium hydroxide is introduced into mixing vessel 20, no significant amount of dibasic calcium hypochlorite blocks is formed. Thus, a smooth homogeneous relatively lump-free milk of lime slurry is produced in vessel 18 which can be forwarded to salt nucleator 30 without the need for further treatment, e.g., grinding, milling, etc. to break-up blocks of dibasic calcium hypochlorite. Lime wetting vessel 18 is equipped with agitating means to form a well stirred lime slurry.

The lime used to prepare the milk of lime slurry in lime wetting vessel 18 advantageously contains a minimum amount of impurities. Preferably, the lime contains between about 90 and about 97 percent by weight of active lime, e.g., calcium hydroxide. A typical lime useful in the present process has the following analysis:

$Ca(OH)_2$: —97.11
$CaCO_3$: —1.00
$CaSO_4$: —0.08
$SiO_2$: —0.45
$Al_2O_3$: —0.25
$Fe_2O_3$: —0.06
$MgO$: —0.05
$H_2O$: —0.60

Preferably, the lime is finely divided so that it blends readily with the aqueous slurry prepared in mixing tank 20. The average particle size of the fresh lime feed added to the process is preferably substantially all minus 325 Tyler mesh, but particles up to about minus 200 mesh can be employed if desired.

Milk of lime slurry from lime wetting tank 18 is forwarded to salt nucleator vessel 30 by means of flow line 25. Also added to vessel 30 is aqueous salt solution saturated with calcium ion and sodium chloride in amounts at least sufficient to dilute the sodium hydroxide in the lime slurry introduced into vessel 30 by flow line 25 or separately introduced thereto by means not shown. Bleach mother liquor recycled to mixing vessel 20 contains only about 9 percent calcium hypochlorite. Since an excess of sodium hydroxide above the stoichiometric proportion required to react with all of the soluble calcium hypochlorite is preferably added to mixing vessel 20, the aqueous lime slurry forwarded by flow line 25 typically contains unreacted sodium hydroxide.

The amount of aqueous salt solution added to salt nucleator 30 can vary, but should be at least sufficient to provide a low driving force for the formation of sodium chloride. Since the aqueous medium of salt nucleator 30 is already substantially saturated in sodium chloride, the addition of sodium hydroxide and aqueous salt solution thereto results in a solution supersaturated with respect to sodium chloride at the temperature of operation, thereby precipitating sodium chloride crystals therein. In the described process, the aqueous diluting salt solution charged to salt nucleator 30 contains a sufficient amount of calcium and chloride ions to react with substantially all of the unreacted sodium hydroxide introduced to that vessel. Consequently, substantially no unreacted sodium hydroxide (as such) is forwarded to chlorinator 34 from vessel 30. Typically, the weight ratio of the aqueous salt solution to the lime slurry feed is at least 3:1, preferably at least 6:1, e.g., from 3:1–10:1.

The aqueous diluting salt solution introduced into vessel 30 can be obtained from several sources in the present process. In accordance with one embodiment of the process, bleach mother liquor is recycled to vessel 30 by means of flow lines 45 and 44. In a further embodiment, chlorinator liquor is withdrawn from the chlorinator and recycled to vessel 30 by means of flow line 36.

The aforesaid liquors (bleach mother liquor and chlorinator liquor) are substantially saturated with hypochlorite and sodium chloride at the temperatures of operation. Thus, they are substantially saturated with calcium ion, hypochlorite ion, sodium ion and chloride ion. The chlorinator liquor recycled to vessel 30 can also contain a relatively small amount of solid sodium chloride and calcium hypochlorite crystals as the chlorinator contains a suspension of such solids in that liquor. Generally, the chlorinator liquor recycled to vessel 30 contains from about 1 to about 20 weight percent, more typically from about 15 to about 18 weight percent of such solids.

It is believed that when the driving force for the formation of solid sodium chloride in vessel 30 (or in the chlorinator) is high, the rate of formation of solid sodium chloride (precipitation of sodium chloride) is relatively fast, thereby resulting in a relatively large number of small solid sodium chloride nuclei being formed. When a large number of such sodium chloride nuclei are thus formed, the crystals of sodium chloride produced by the process do not grow sufficiently in size to be readily separated in the later separation stage from the particles of agglomerated calcium hypochlorite crystals. The result of that condition is that the sodium chloride content of the calcium hypochlorite product is increased, thereby decreasing the assay of the bleach product. On the other hand, when the driving force for formation of solid sodium chloride is low, the rate of formation of solid sodium chloride is relatively slow and a lesser number of sodium chloride nuclei is formed. Consequently, the crystals of sodium chloride grow larger. By low driving force is meant that the rate at which supersaturation occurs is relatively low. The number of sodium chloride nuclei produced is correspondingly low and the number of sites upon which crystal growth can occur is limited.

The amount of sodium chloride salt precipitated in salt nucleator vessel 30 will vary depending on where sodium hydroxide is introduced into the system and the concentration of such sodium hydroxide. In the embodiment where all of the sodium hydroxide requirements for the process are added to the system in mixing vessel 20, the milk of lime slurry in flow line 25 will contain unreacted sodium hydroxide and same will substantially react in the salt nucleator and form some solid salt. When the concentration of sodium hydroxide used is at least 53 weight percent, solid salt will also form in mixing vessel 20. Conversely, when the sodium hydroxide concentration is less than 53 weight percent, e.g., 50 weight percent, solid salt will not form in vessel 20.

In the embodiment where less than all of the sodium hydroxide requirements for the process are added to mixing vessel 20, e.g., a stoichiometric proportion (as earlier described), the remaining requirements can be added directly to salt nucleator 30. The concentration of the sodium hydroxide thus added will depend on the concentration of the sodium hydroxide added to vessel 20, i.e., in order to control the water balance in the system. Thus, if all of the water needed to balance the system is added with the sodium hydroxide charged to vessel 20, anhydrous sodium hydroxide will be added to salt nucleator 30. As described above, solid salt may be formed in vessel 20 depending upon the concentration of the sodium hydroxide used.

Salt nucleator 30 is a tank or other suitable container and typically has a volume substantially smaller than chlorinator vessel 34. Typically, the volume of the chlorinator will be 10 to 200, e.g., 15 to 40, times as large as the volume of vessel 30. Vessel 30 is equipped with agitator means so that the lime slurry and aqueous diluting salt solution feed stream(s) charged thereto can be readily admixed to form a well-stirred homogeneous mixture in a relatively short time. Unlike the chlorinator, wherein mixing is conducted in a moderate fashion to avoid breaking the more fragile calcium hypochlorite crystals and avoid breakthrough of unreacted elemental chlorine, mixing in vessel 30 can be performed vigorously to achieve rapid admixing of the feed streams to a homogeneous mixture.

The temperature of vessel 30 is typically about room temperature, e.g., between about 15° C. and 35° C., usually between about 20° C. and 30° C. The temperature is not controlled at any particular value; but, is a function of the temperature and quantity of the feed streams charged to it and the surrounding ambient temperature. Thus, the temperature of the reaction mixture in salt nucleator 30 is allowed to reach whatever temperature equilibrium conditions dictate.

The aqueous homogenous reaction mixture prepared in vessel 30 is removed therefrom and forwarded by flow line 31 to chlorinator 34. The average residence time of the reaction mixture in vessel 30 is relatively short, i.e., on the average of from about 2 to about 12, e.g., from about 4 to 8 minutes; however, it can be longer if desired.

Elemental chlorine from source 10 is forwarded by means of flow line 12 to chlorinator 34, which contains agitator means for moderately mixing the liquid reaction mixture therein. Elemental chlorine is introduced into chlorinator 34 in a manner to effectively disperse the chlorine within the chlorination zone of the chlorinator and effect complete reaction of the chlorine with the alkali content, i.e., the hydroxide ion concentration, e.g., calcium hydroxide, within the chlorinator. The amount of chlorine introduced into chlorinator 34 is that amount which is required stoichiometrically to react with from about 93 percent to about 99 percent, preferably 96 percent to 99 percent, of the total alkali content of the reaction mixture. Preferably, the reaction mixture is maintained slightly alkaline to avoid decomposition of calcium hypochlorite. Moreover, use of an excess of chlorine (to achieve 100% reaction of the alkali) is not encouraged for the reason that it can result in incomplete utilization of the chlorine added and breakthrough of unreacted chlorine to the vapor space above the liquid level within the chlorinator. Such nonutilized chlorine requires disposal or recycling to the chlorinator which adds to the investment costs of the process. The feed rate of elemental chlorine to the chlorinator is preferably maintained as fast as possible but not so fast as to result in incomplete utilization of chlorine within the reaction mixture.

The design of the chlorinator vessel is not critical to the invention described herein. A chlorinator which has been found to be useful in the described process is one which is in the form of a cylindrical vessel with a draft tube containing an agitator. The chlorine is introduced beneath the impeller of the agitator within the draft tube and is, thereby, effectively dispersed within the chlorinator. The chlorinator vessel should be of a size sufficient to permit an adequate average residence time therein of the reaction mixture. Average residence times of from about 5 to 15 hours are contemplated.

The temperature of the reaction mixture within the chlorinator is typically maintained at less than 35° C., e.g., between about 10° C. and about 30° C., preferably between about 15° C. and about 20° C., by employing auxiliary cooling means, e.g., indirect heat exchangers. Such heat exchangers can be located within the chlorinator or can be external thereto, e.g., by use of a side arm cooler. Temperatures of more than about 30° C.–35° C. result in the accelerated decomposition of calcium hypochlorite.

Chlorination of the reaction mixture introduced into chlorinator 34 from vessel 30 results in the formation of further crystals of calcium hypochlorite and sodium chloride and the growth of preexisting crystals of the aforesaid chemical species. Chlorination is conducted in the presence of a preformed seed bed of calcium hypochlorite and sodium chloride crystals which are present in the chlorinator. Such seed crystals are typically of the same size range as the calcium hypochlorite product and by-product salt described hereinafter. Thus, precipitation and growth of newly formed crystals occurs in the presence of and on the surfaces of previously formed crystals, thereby allowing the growth of product calcium hypochlorite and by-product sodium chloride to their relative appropriate sizes. In this way, further separable and recoverable amounts of the desired neutral calcium hypochloride are produced.

When starting the process for the first time, the chlorinator can be filled to an appropriate level to achieve good circulation with a synthetic aqueous reaction mixture, e.g., an aqueous solution saturated with calcium hypochlorite and sodium chloride. An appropriate amount of solid calcium hypochlorite and sodium chloride particles can also be added to serve as a seed bed. The reaction mixture from vessel 30 and chlorine are than added simultaneously to the chlorinator. Product is then withdrawn to the subsequent stages of the process. When re-starting the process after a shut down and cleaning of the chlorinator, the chlorinator can be partially filled with a synthetically prepared aqueous liquid reaction mixture and a heel of preformed crystals of calcium hypochlorite and sodium chloride obtained from the process prior to shut down added to the synthetic reaction mixture. The process is then operated as described with respect to an initial start-up.

The neutral calcium hypochlorite crystals formed in the chlorinator in accordance with the present process have a lamellar tetragonal crystal habit. The crystals of sodium chloride formed in the present process have a cubic crystal habit and typically range in size between about 100 and 700 microns. The majority of the salt crystals have a crystal size of between about 250 and 550 microns.

The weight mean average particle size of sodium chloride crystals recovered from the present process is greater than 200 microns, e.g., between about 280 and 420 microns, more typically between 350 and 400 microns. When the salt crystals are within the aforesaid size range, they are readily separable from the relatively smaller calcium hypochlorite particles, which particles are agglomerates of calcium hypochlorite crystals. These particles typically have a weight mean average particle size of between about 50 microns and 120 microns, more typically between about 80 and 100 microns. Accordingly, the weight mean average particle size of the separated sodium chloride crystals is at least 80, more typically at least 230, microns larger than the weight mean average particle size of the calcium hypochlorite particles produced in the process. This weight mean average size differential can be as high as 370 microns, or higher. Thus, the aforesaid size differential will typically range between 80 and 370 microns, e.g., between about 250 and 320 microns.

Referring again to the drawing, a product stream comprising sodium chloride crystals, neutral calcium hypochlorite particles and suspending chlorinator liquor is removed from chlorinator 34 via flow line 35 and conveyed to a classification zone 38 wherein the crystals of sodium chloride are separated from the particles of calcium hypochlorite. Removal of the product stream from chlorinator 34 can be on a batch or continuous basis. Preferably, the process is operated continuously. The rate at which product is removed will depend on the rated capacity of the plant and the residence time in the chlorinator. Typically, from about 5 to about 25 percent, e.g., 10 to 20 percent, of the volume of the chlorinator is removed per hour of continuous operation.

Any of the commonly known methods for separating solids of different sizes suspended in a liquid medium can be used to separate the crystals of sodium chloride from the particles of calcium hypochlorite. Examples of techniques which can be used include flotation, decantation, hydrocloning, gravity separation, or any other separation method which utilizes the difference in size and/or bulk density of the two crystal species produced in the chlorinator. Preferably, a gravity classifier of the up-flow type is employed, i.e., a classifier operating by an elutriation/sedimentation technique. In such a classifier, the calcium hypochlorite particles are maintained in suspension in mother liquor present in the upper portion of the classifying zone and a bed of larger, heavier sodium chloride crystals maintained in the lower portion of the classifying zone. Several classifiers, e.g., two, connected in series can be used to classify the solids. The aforesaid elutriation classification technique and its operation, as described herein, is the subject of a separate co-assigned patent application.

In accordance with the embodiment described in the accompanying drawing, a product stream is withdrawn from chlorinator 34 and forwarded to classification zone 38. An aqueous slurry rich in calcium hypochlorite particles is removed from zone 38 by means of flow line 39 and forwarded to filter means 42. The solid phase of this slurry removed from the classification zone is predominantly calcium hypochlorite. Bleach mother liquor associated with the calcium hypochlorite particles is separated therefrom in filter means 42 in a manner known in the art and removed by means of flow line 41. A portion of this bleach filter mother liquor is recycled to the classification zone 38 by means of flow line 40. A further portion of the bleach filter mother liquor is recycled by means of flow line 45 to mixing vessel 20. Another portion of recycled bleach filter mother liquor can be forwarded by flow line 44 to salt nucleator 30 to serve as diluting aqueous salt solution.

Wet calcium hypochlorite filter cake is removed from filter means 42 via flow line 43 and dried with dry air. Moist cake from filter means 42 contains from about 45 to about 55 percent by weight of calcium hypochlorite, from about 8 to about 12 percent by weight of sodium chloride, and from about 30 to about 40 percent by weight of water. This moist cake can be used directly in the treatment of water systems, such as swimming pools and the like; but, is generally dried and stored prior to use. The moist cake is dried by conventional known means, for example, using a turbo dryer, fluid bed dryer, or vacuum dryer in a known manner where appropriate temperature ranges are employed to quickly reduce the water content of the wet filter cake to the desired level.

In the process of the present invention, the neutral calcium hypochlorite-containing moist cake is dried with hot, e.g., 330°–350° F. (166°–177° C.), dry air while maintaining the product temperature in the range of from about 60° F. (15.6° C.) to about 180° F. (82° C.) and preferably from about 75° F. (24° C.) to about 120° F. (49° C.) to give a calcium hypochlorite product having at least 65 weight percent available chlorine (as calcium hypochlorite) and a water content of from about 2 to about 12 percent by weight, the bulk of the remaining contents being sodium chloride.

Any means suitable for separating bleach filter mother liquor from the slurry of calcium hypochlorite particles withdrawn from classification zone 38 can be used. It is important that the selected means removes sufficient quantities of the entrained mother liquor from the calcium hypochlorite particles. Since the concentration of sodium chloride within the mother liquor is about twice that of calcium hypochlorite, drying of a calcium hypochlorite filter cake containing a high percentage of retained mother liquor reduces the assay of the dried product and can result in the production of a calcium hypochlorite having an available chlorine content less than the desired commercial value, e.g., 65 percent. Further, retention of large amounts of water with the calcium hypochlorite produce increases the evaporation (drying) load of the process and adversely affects the economics of the process. Useful filtration equipment for separating calcium hypochlorite crystals from its entraining mother liquor include a centrifuge, plate and frame filters or other similar solid-liquid separating means. Preferably, high pressure expression equipment such as a tube filter press, piston filter press or membrane filter is used.

A slurry of sodium chloride crystals is removed from classification zone 38 by means of flow line 47 and forwarded to solid-liquid separation means, i.e., salt centrifuge 56, wherein mother liquor associated with the sodium chloride crystals is separated therefrom. This mother liquor is removed from centrifuge 56 by means of flow line 52 and recycled to bleach filter means 42. Since this stream is substantially saturated with sodium chloride and saturated with calcium hypochlorite, it can also be used anywhere in the system there is a need for such a fluid. Any separating means suitable for separating the salt crystals from its entraining mother liquor can be used. Such separating means include a centrifuge, conventional plate and frame filter, or any similar solid-liquid separating means.

Wet sodium chloride crystals of relatively high assay are removed from salt centrifuge 56 by means of flow line 58. The salt recovered from the process can be used directly to prepare salt solutions capable of being electrolyzed to produce sodium hydroxide and chlorine, which can be used as reactants in the present process, or for other industrial applications. Typically, the by-product salt is substantially free of calcium hypochlorite, i.e., it contains less than 2 weight percent, e.g., from 1 to 2 weight percent of calcium hypochlorite.

The present invention is more particularly described in the following example which is intended as illustrative only since numerous modifications and variations therein will be apparent to those skilled in the art. In that example, all percentages are by weight. Flow rates and other values are average values reflecting normal fluctuations in a continuous process. For startup, process mother liquors were synthetically prepared. Chlorinator liquor was prepared by slurrying solid calcium hypochlorite and sodium chloride with synthetic mother liquor.

EXAMPLE

Aqueous sodium hydroxide solution (56%) having a temperature of about 50° C. is introduced to mixing tank 20 at a rate of about 31 grams per minute (gpm) wherein it is admixed with recycled bleach mother liquor, which is introduced to mixing tank 20 at a rate of 180 gpm. The recycled mother liquor has a temperature of about 18° C. and contains about 8.7% calcium hypochlorite, 19.5% sodium chloride and 69.5% water. The resulting aqueous mixture is forwarded at a rate of about 211 gpm to lime wetting tank 18 wherein it is blended with lime charged at a rate of about 18 gpm. The lime contains about 97 percent active lime and is minus 325 Tyler mesh.

Milk of lime slurry from tank 18 is forwarded to salt nucleator 30 at a rate of about 229 gpm where it is admixed with recycled chlorinator liquor, which is introduced to salt nucleator 30 at a rate of about 1200 gpm. The chlorinator liquor contains about 18% calcium hypochlorite, 21% sodium chloride and 59% water—the remainder being composed essentially of other chemical species, e.g., calcium chloride, calcium hydroxide, and calcium chlorate. Gaseous elemental chlorine, at a rate of about 31 gpm is introduced into chlorinator 34 along with about 1429 gpm of diluted lime slurry from salt nucleator 30. The contents of the chlorinator are maintained at about 18° C. by cooling means external to the chlorinator and are agitated with a propeller type agitator. The pH of the reaction mixture is maintained at about 9.5 by controlling the chlorine feed.

About 260 gpm of chlorinator discharge is removed from the chlorinator and forwarded to classification zone 38. A slurry of calcium hypochlorite particles is removed from zone 38 and forwarded to bleach filter 42. This slurry contains about 13.5 percent calcium hypochlorite, 17 percent sodium chloride and 66.5 percent water. The wet bleach cake removed from filter means 42, by flow line 43 contains about 52.8 percent calcium hypochlorite, 7.1 percent sodium chloride, and 37.2 percent water.

A slurry of sodium chloride crystals is removed from classification zone 38 and forwarded to centrifuge 56. Wet salt cake recovered from centrifuge 56 contains about 95.2 percent sodium chloride and 1.2 percent calcium hypochlorite.

The process is operated in this manner for about 245 hours. Samples of sodium chloride salt taken from chlorinator 34 during this period exhibit a weight mean average particle size which range between about 280 and 420 microns with an overall average of about 370 microns.

Although the present process has been described with reference to specific details of certain embodiments thereof, it is not intended that such details should be regarded as limitations upon the scope of the invention except as and to the extent that they are included in the accompanying claims.

What is claimed is:

1. A process for preparing calcium hypochlorite which comprises,
   (a) admixing with agitation in the absence of added elemental chlorine:
      (1) aqueous solution substantially saturated with sodium chloride and calcium hypochlorite, and
      (2) sodium hydroxide in amounts at least sufficient to react with substantially all of the calcium hypochlorite in said aqueous solution, thereby to form an aqueous slurry of precipitated lime,
   (b) admixing lime with aqueous slurry obtained in step (a), thereby to form an aqueous lime slurry,
   (c) adding further sodium hydroxide, when required, to said aqueous lime slurry, in amounts required to provide in combination with the sodium hydroxide added in step (a) substantially stoichiometric amounts thereof based on the calcium oxide content of the lime added in step (b),
   (d) diluting aqueous lime slurry containing said substantially stoichiometric amount of sodium hydroxide with aqueous salt solution saturated with calcium ion and sodium chloride in amounts at least sufficient to dilute the sodium hydroxide therein,
(e) adding elemental chlorine to the diluted aqueous lime slurry of step (d) in the presence of a seed bed of sodium chloride crystals and neutral calcium hypochlorite crystals at temperatures at which loss of calcium hypochlorite by accelerated decomposition is avoided, thereby forming further neutral calcium hypochlorite crystals and sodium chloride crystals in aqueous chlorinator liquor, said sodium chloride crystals being significantly larger than the calcium hypochlorite crystals,
(f) segregating said larger crystals of sodium chloride from said crystals of calcium hypochlorite to form an aqueous slurry rich in crystals of calcium hypochlorite and an aqueous slurry rich in crystals of sodium chloride, and
(g) separating aqueous slurry rich in calcium hypochlorite crystals into a wet cake of calcium hypochlorite and mother liquor substantially saturated with sodium chloride and calcium hypochlorite.

2. The process of claim 1 wherein the mother liquor of step (g) is recycled to step (a) as the aqueous solution substantially saturated with sodium chloride and calcium hypochlorite.

3. The process of claims 1 or 2 wherein all of the sodium hydroxide requirements for the process is added in step (a).

4. The process of claim 3 wherein the concentration of the sodium hydroxide used ranges from 40 to 73 weight percent.

5. The process of claim 1 wherein the diluting aqueous salt solution is selected from recycled mother liquor substantially saturated with sodium chloride and calcium hypochlorite, recycled chlorinator liquor, and mixtures of recycled mother liquor and recycled chlorinator liquor.

6. The process of claim 1 wherein an amount of sodium hydroxide in excess of the stoichiometric proportion required to react with all of the calcium hypochlorite is added in step (a).

7. The process of claim 5 or 6 wherein the weight ratio of said aqueous salt solution to said aqueous lime slurry is at least 3:1.

8. A continuous process for preparing calcium hypochlorite which comprises,
(a) admixing with agitation in the absence of added elemental chlorine:
(1) bleach mother liquor obtained from step (g), and
(2) a substantially stoichiometric amount of sodium hydroxide, basis the calcium oxide content of the lime feed of step (b), thereby to form an aqueous slurry of precipitated lime,
(b) admixing lime with aqueous slurry obtained in step (a), thereby to form an aqueous lime slurry,
(c) diluting aqueous lime slurry of step (b) with aqueous salt solution saturated with calcium ion and sodium chloride in amounts at least sufficient to dilute the sodium hydroxide therein,
(d) adding elemental chlorine to the diluted aqueous lime slurry of step (c) in the presence of a seed bed of sodium chloride crystals and neutral calcium hypochlorite crystals at temperatures at which loss of calcium hypochlorite by accelerated decomposition is avoided, thereby forming further neutral calcium hypochlorite crystals and sodium chloride crystals in aqueous chlorinator liquor, said sodium chloride crystals being significantly larger than the calcium hypochlorite crystals,
(e) segregating said larger crystals of sodium chloride from said crystals of calcium hypochlorite to form an aqueous slurry rich in crystals of calcium hypochlorite and an aqueous slurry rich in crystals of sodium chloride,
(f) separating aqueous slurry rich in calcium hypochlorite crystals into a wet cake of calcium hypochlorite and bleach mother liquor, and
(g) recycling bleach mother liquor to step (a).

9. The process of claim 8 wherein the mole ratio of sodium hydroxide to calcium oxide is from about 1.7:1 to about 2:1.

10. The process of claims 8 or 9 wherein the concentration of the sodium hydroxide used ranges from 40 to 73 weight percent.

11. The process of claims 8 or 9 wherein the concentration of the sodium hydroxide used is from 50 to 65 weight percent.

12. The process of claims 8 or 9 wherein the concentration of the sodium hydroxide used is at least 53 weight percent and the aqueous slurry of precipitated lime also contains precipitated sodium chloride.

13. The process of claim 10 wherein the diluting aqueous salt solution is selected from recycled mother liquor substantially saturated with sodium chloride and calcium hypochlorite, recycled chlorinator liquor, and mixtures of recycled mother liquor and recycled chlorinator liquor.

14. The process of claim 11 wherein the diluting aqueous salt solution is selected from recycled mother liquor substantially saturated with sodium chloride and calcium hypochlorite, recycled chlorinator liquor, and mixtures of recycled mother liquor and recycled chlorinator liquor.

15. The process of claim 14 wherein bleach mother liquor in amounts sufficient to at least thoroughly wet the lime feed of step (b) is recycled to step (a).

16. The process of claim 15 wherein the weight ratio of recycled bleach mother liquor to sodium hydroxide in step (a) is from 5.2:1 to 12.5:1.

17. The process of claim 10 wherein chlorine in amounts sufficient to react with from 93 to about 99 percent of the total alkali content of the diluted aqueous lime slurry is added in step (d).

18. The process of claim 17 wherein the weight mean average particle size of the segregated sodium chloride crystals is at least 80 microns larger than the weight mean average particle size of the calcium hypochlorite particles.

19. The process of claim 10 wherein the weight ratio of said aqueous salt solution to said aqueous lime slurry is at least 3:1.

20. The process of claim 14 wherein the weight ratio of said aqueous salt solution to said aqueous lime slurry is at least 3:1.

21. A process for preparing calcium hypochlorite which comprises,
(a) admixing with agitation in the absence of added elemental chlorine:
(1) aqueous solution substantially saturated with sodium chloride and calcium hypochlorite, and
(2) sodium hydroxide in amounts at least sufficient to react with substantially all of the calcium hypochlorite in said aqueous solution, thereby to form an aqueous slurry of precipitated lime, (b) admixing lime with aqueous slurry obtained in step (a), thereby to form an aqueous lime slurry, (c) adding further sodium hydroxide, when required, to said aqueous lime slurry, in amounts required to provide in combination with the sodium hydroxide added in step (a) substantially stoichiometric amounts thereof based on the calcium oxide content of the lime added in step (b), (d) diluting aqueous lime slurry containing said substantially stoichiometric amount of sodium hydroxide with aqueous salt solution saturated with calcium ion and sodium chloride in amounts at least sufficient to dilute the sodium hydroxide therein, and (e) adding elemental chlorine to the diluted aqueous lime slurry of step (d) in the presence of a seed bed of sodium chloride crystals and neutral calcium hypochlorite crystals at temperatures at which loss of calcium hypochlorite by accelerated decomposition is avoided, thereby forming further neutral calcium hypochlorite crystals and sodium chloride crystals in aqueous chlorinator liquor, said sodium chloride crystals being significantly larger than the calcium hypochlorite crystals.

22. A continuous process for preparing calcium hypochlorite which comprises, (a) admixing with agitation in the absence of added elemental chlorine:
 (1) aqueous solution substantially saturated with sodium chloride and calcium hypochlorite, and
 (2) a substantially stoichiometric amount of sodium hydroxide, basis the calcium oxide content of the lime feed of step (b), thereby to form an aqueous slurry of precipitated lime, (b) admixing lime with aqueous slurry obtained in step (a), thereby to form an aqueous lime slurry, (c) diluting aqueous lime slurry of step (b) with aqueous salt solution saturated with calcium ion and sodium chloride in amounts at least sufficient to dilute the sodium hydroxide therein, and (d) adding elemental chlorine to the diluted aqueous lime slurry of step (c) in the presence of a seed bed of sodium chloride crystals and neutral calcium hypochlorite crystals at temperatures at which loss of calcium hypochlorite by accelerated decomposition is avoided, thereby forming further neutral calcium hypochlorite crystals and sodium chloride crystals in aqueous chlorinator liquor, said sodium chloride crystals being significantly larger than the calcium hypochlorite crystals.

* * * * *